US012743578B2

(12) United States Patent
Li

(10) Patent No.: US 12,743,578 B2
(45) Date of Patent: Sep. 22, 2026

(54) LARGE LANGUAGE MODELS FOR MICROSERVICE FAULT RECOVERY

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 140 days.

(21) Appl. No.: 18/952,547

(22) Filed: Nov. 19, 2024

(65) Prior Publication Data

US 2026/0141172 A1 May 21, 2026

(51) Int. Cl.
*G06F 40/00* (2020.01)
*G06F 9/54* (2006.01)
*G06F 40/216* (2020.01)

(52) U.S. Cl.
CPC ............ *G06F 40/216* (2020.01); *G06F 9/547* (2013.01)

(58) Field of Classification Search
CPC .. G06F 16/3329; G06F 40/30; G06F 16/2455; G06F 16/3331; G06F 16/334; G06F 16/3344; G06F 16/3347; G06F 16/3349; G06F 16/337; G06F 16/36; G06F 40/00; G06F 40/268; G06F 40/274; G06F 2209/541; G06F 2209/542; G06F 8/20; G06F 8/38; G06N 20/00; G06N 3/045; G06N 3/08; G06N 3/0475; G06N 3/0455; G06N 3/09; G06N 3/044; G06N 5/022; G06N 3/0464; G06N 20/20; G06N 5/04; G06N 3/088; G06N 3/0442; G06N 3/096; G06N 3/0895; G06N 3/042; G06N 5/02; G06N 3/092; G06N 3/048; G06N 20/10; G06N 5/025; G06N 3/094; G06N 3/02; G06N 3/082; G06N 3/091; G06N 3/098; G06N 5/045; G06N 5/046; G06N 3/043;
(Continued)

(56) References Cited

U.S. PATENT DOCUMENTS 11,397,575 B2 * 7/2022 Wan ........................ G06F 9/547
11,966,725 B2 * 4/2024 Kanso ..................... G06F 8/433
(Continued)

OTHER PUBLICATIONS

Peng, Baolin, et al. "Check your facts and try again: Improving large language models with external knowledge and automated feedback." arXiv preprint arXiv:2302.12813 (2023). (Year: 2023).*
(Continued)

*Primary Examiner* — Edgar X Guerra-Erazo
(74) *Attorney, Agent, or Firm* — SCHWEGMAN LUNDBERG & WOESSNER, P.A.

(57) ABSTRACT

In an example embodiment, an LLM is used to identify similar microservices to allow a microservice that is similar to a dependent microservice that is down to be used instead of the downed dependent microservice until the downed dependent microservice can be brought back online. Specifically, the LLM is utilized in two different manners. First, it is used to generate an embedding for an API of each of multiple microservices in a system. These embeddings may then be used to retrieve similar APIs to the API of a downed microservice. Then the LLM can be further used to select the most qualified of the similar APIs, based on similar functionality and input/output parameters. The most qualified of the APIs can then be tested for final selection of a (temporary) replacement API that can be used in lieu of the API of the downed microservice.

20 Claims, 5 Drawing Sheets

(58) Field of Classification Search
CPC ....... G06N 5/048; G10L 15/183; G10L 15/16; G10L 25/30; G10L 17/18; G10L 15/083
See application file for complete search history.

(56) References Cited

U.S. PATENT DOCUMENTS

| | | | | |
|---|---|---|---|---|
| 2022/0188104 | A1* | 6/2022 | Wan | G06F 9/547 |
| 2024/0362093 | A1* | 10/2024 | Zhou | G06F 16/243 |
| 2024/0403634 | A1* | 12/2024 | Hawes | G06N 3/08 |
| 2025/0200073 | A1* | 6/2025 | Ragukumar | G06F 16/285 |
| 2025/0371321 | A1* | 12/2025 | Khafizov | G06N 3/0475 |
| 2026/0017386 | A1* | 1/2026 | Ohayon | G06F 21/577 |
| 2026/0140773 | A1* | 5/2026 | Vítecek | G06F 9/5027 |

OTHER PUBLICATIONS

Wang, Tingting, and Guilin Qi. “A comprehensive survey on root cause analysis in (micro) services: Methodologies, challenges, and trends.” arXiv preprint arXiv:2408.00803 (2024). (Year: 2024).*

* cited by examiner

LARGE LANGUAGE MODELS FOR MICROSERVICE FAULT RECOVERY

TECHNICAL FIELD

This document generally relates to computer systems. More specifically, this document relates to use of large language models for microservice faut recovery.

BACKGROUND

A large language model (LLM) refers to an artificial intelligence (AI) system that has been trained on an extensive dataset to understand and generate human language. These models are designed to process and comprehend natural language in a way that allows them to answer questions, engage in conversations, generate text, and perform various language-related tasks.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Microservices are small, independent software processes that can be written in multiple languages. An infrastructure designed for these modular components is known as a microservices environment or microservices architecture. Cloud environments may be used to implement microservices environments. An example of a microservices environment is SAP Cloud Platform® Extension Manager, from SAP SE of Walldorf, Germany. Another example is Cloud Application Lifecycle Management (CALM)®, from SAP SE of Walldorf, Germany.

Figure 1:
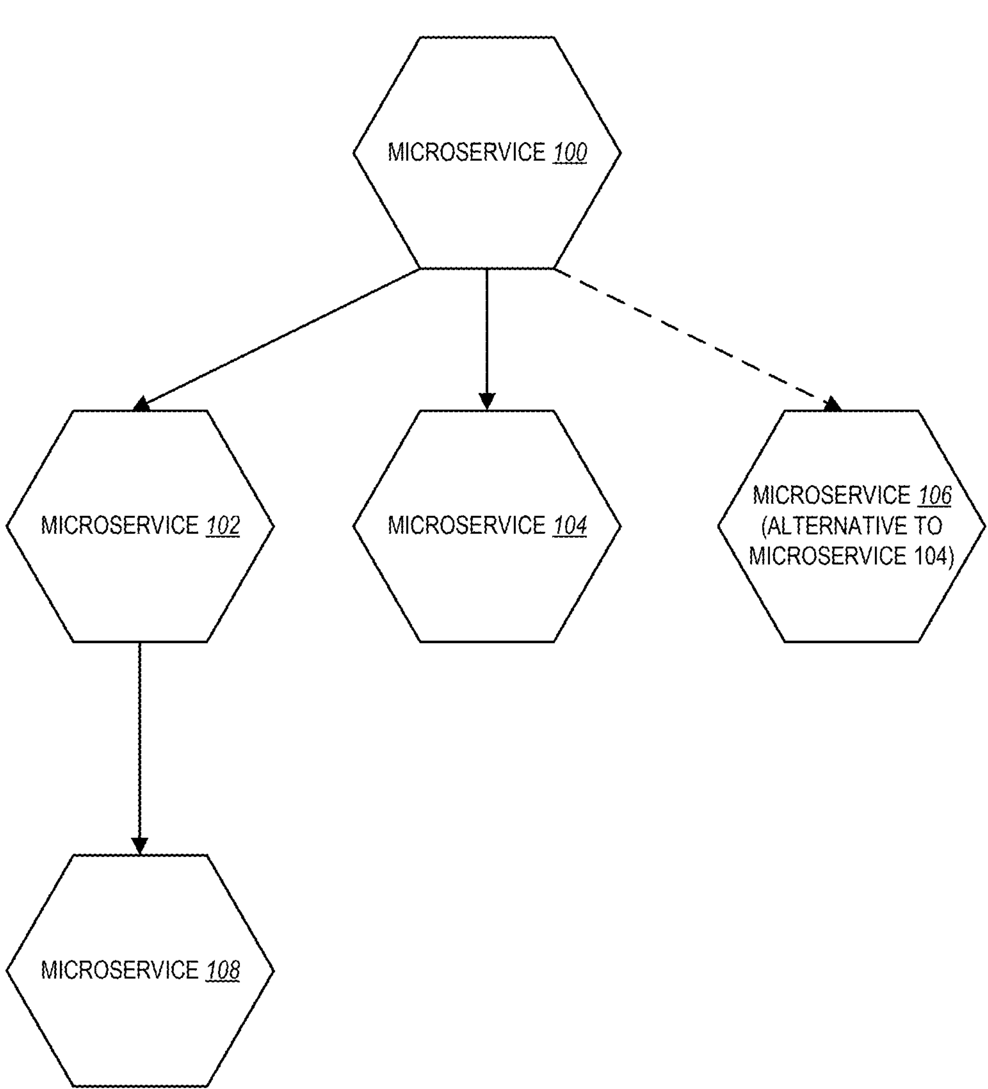
FIG. 1 is a diagram illustrating dependent microservices, in accordance with an example embodiment.

Microservices often communicate with each other via remote call, such as by using Hypertext Transfer Protocol (HTTP) or g Remote Procedure Call (gRPC) calls. Sometimes microservices are dependent on other microservices. FIG. 1 is a diagram illustrating dependent microservices, in accordance with an example embodiment. Here, Microservice 100 is dependent on Microservice 102, Microservice 104, and Microservice 106. Likewise, Microservice 102 is dependent on Microservice 108. These dependencies are caused by a first microservice needing another microservice to perform some task in order for the first microservice to perform a task of its own. For example, Microservice 100 may need a longitude and latitude output by Microservice 102 in order for Microservice 100 to calculate a distance.

Sometimes, due to some unexpected hardware/software error, some portion or part of the dependency services may become unavailable (e.g., the Application Program Interface (API), a database connector, loss of power, etc). For example, if the API of Microservice 102 is down, the Microservice 100 will not be able to fetch data from it. Some functions of Microservice 100 will then become unavailable until the API, or other nonfunctioning part of Microservice 102 is fixed or otherwise brought back online.

Recovery from such issues can be technically challenging. One approach would be to run redundant backups of each microservice, but that requires significant storage and processing usage.

In an example embodiment, an LLM is used to identify similar microservices to allow a microservice that is similar to a dependent microservice that is down to be used instead of the downed dependent microservice until the downed dependent microservice can be brought back online. Specifically, the LLM is utilized in two different manners. First, it is used to generate an embedding for an API of each of multiple microservices in a system. These embeddings may then be used to retrieve similar APIs to the API of a downed microservice. Then, the LLM can be further used to select the most qualified of the similar APIs, based on similar functionality and input/output parameters. The most qualified of the APIs can then be tested for final selection of a (temporary) replacement API that can be used in lieu of the API of the downed microservice.

Figure 2:
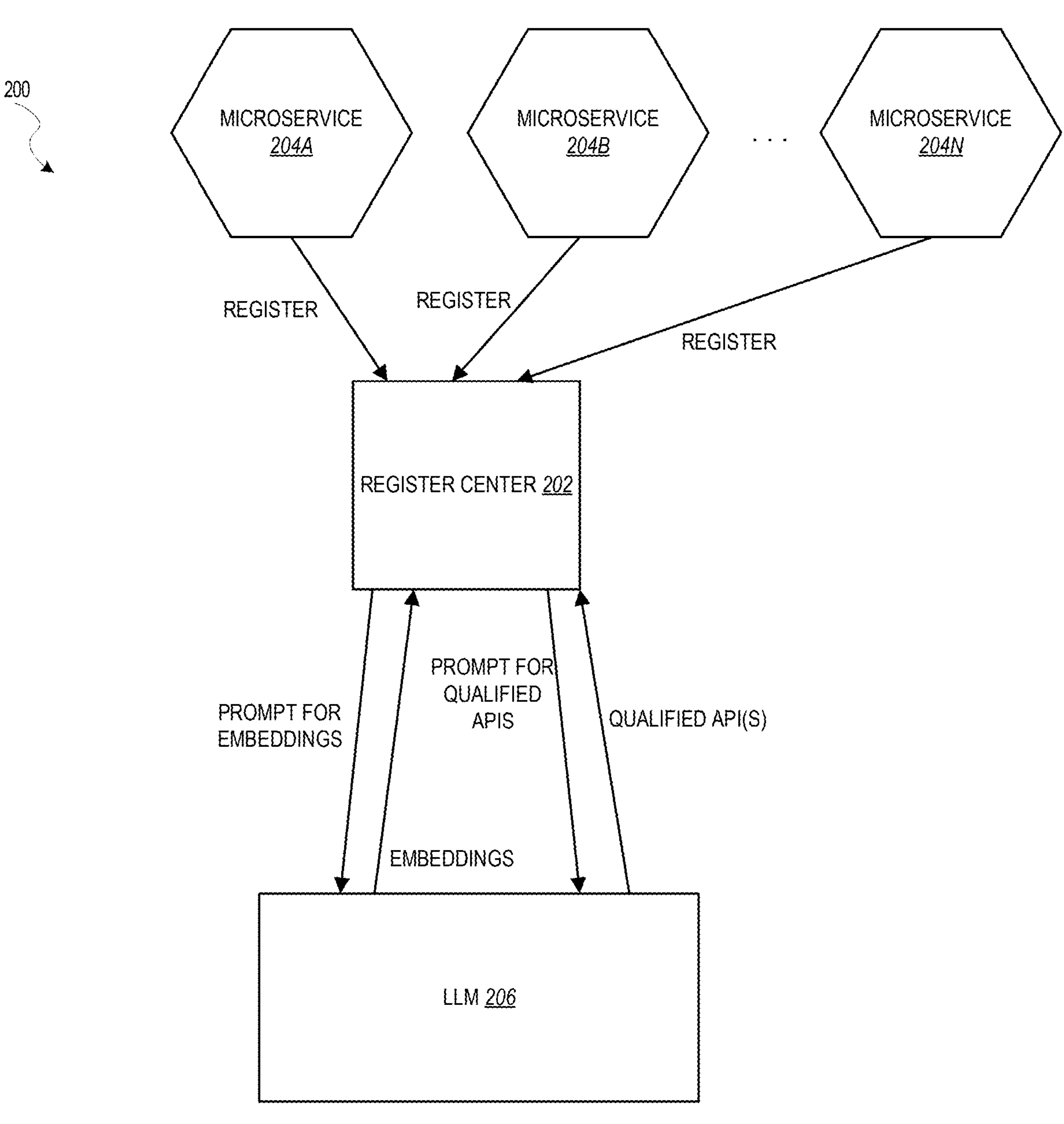
FIG. 2 is a block diagram illustrating a system or managing downed microservices, in accordance with an example embodiment.

FIG. 2 is a block diagram illustrating a system 200 for managing downed microservices, in accordance with an example embodiment. In an example embodiment, a centralized repository of APIs may be established. This centralized repository may be termed the register center 202. The register center 202 collects the detailed documents for all the APIs of various microservices 204A, 204B, . . . , 204N. This includes microservices that are dependent and also microservices that are not dependent. The documents include the code of the respective APIs, although it is not necessary that all the code of each API be used. In some instances, it is enough that the relevant code of each API be used. For purposes of this disclosure, the relevant code or entire code of an API may be embodied in a document fragment of the API.

In some example embodiments, in addition to the register center 202 collecting these document fragments, it also collects the uniform resource locator (URL) and status of the respective microservices. The register center 202 can continuously collect and update the status of the various microservices (e.g. down, not down) and document fragments for each API as these APIs can be modified and adjusted from time to time. In one example, register center 202 can occasionally ping a set of microservices to determine if any of them are down by a microservice failing to respond to the ping or responding after too long a time period. Once so determined, register center 202 can alert upstream microservices (e.g., microservice 100) that a downstream microservice (e.g. microservice 104) is down and use the alternative API and alternative address or URL to utilize operational microservice 106 to complete its tasks. It should be noted that the upstream microservice may have the alternative API already stored therein to communicate with the replacement downstream microservice or the alternative API could be sent by the register center 202 or other computing element to the upstream microservice.

The register center 202 interacts with an LLM 206 to obtain, for each document fragment, an embedding. An embedding is a set of coordinates in a latent n-dimensional space such that the proximity (e.g., cosine distance) of the coordinates to other coordinates is indicative of the similarity of the information embedded to those coordinates. In an example embodiment, the embedding is a high-dimensional (e.g., 1536-dimension) floating point vector. An example of an N-dimensional embedding is as follows:

$$v = [0.001, 0.015, -0.030, \ldots \ldots, 0.002]^T \text{ ($N$ elements in the vector)}$$

The LLM 206 translates the document fragment for each API into an embedding. The register center 202 then stores the embeddings in a database, such as in a table as follows:

TABLE 1

| Data structure of information collected by the register center | | | | | | |
|---|---|---|---|---|---|---|
| URL | Method | Service | Address | Status | Document | Embeddings |
| /position/{cityCode} | GET | svc1 | http://svc1/v1 | available | <document content> | <vector> |
| . . . | | | . . . | . . . | . . . | . . . |

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance.

The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs comprise a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modeling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. GAN is a supervised machine learning model that has two sub-models: a generator model that is trained to generate new examples, and a discriminator model that tries to classify examples as either real or generated. The two models are trained together in an adversarial manner (using a zero-sum game according to game theory) until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, though a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well, or not, the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

The present solution works with any type of GAI model, although an implementation that specifically is used with a GPT model will be described.

Referring back to FIG. 2, the register center 202 then calculates correlation coefficients of pairs of embeddings. This essentially compares how similar the document fragment for one API is to the document fragment of another API. Depending upon implementation, this calculation could be performed at different times. In some example embodiments, the calculations are performed when a microservice is detected to be down. In these example embodiments, the register center 202 calculates cosine coefficients for each combination of the downed microservice and other microservice. Thus, for example, if there are two hundred document fragments registered with the register center 202 (each corresponding to an API of a microservice), then when a first microservice is detected to be down, one hundred and ninety nine different cosine coefficients is calculated, one for each combination the embedding for the document fragment of the API for the first microservice is and an embedding of another document fragment.

In other example embodiments, the cosine coefficients may be calculated offline, prior to any microservice being down. Here, each combination of document fragment is used to obtain the correlation coefficients for each combination, and these correlation coefficients are stored in a manner that allows relevant correlation coefficients to be retrieved at runtime (e.g., correlation coefficients of each possible pair of the two hundred document fragments are calculated and stored).

Regardless of when the cosine correlation coefficients are calculated, they may be calculated using the following formula:

$$c_{0,i} = \frac{\sum_{n=1}^{N}(v_{0,n} \cdot v_{i,n})}{\sqrt{\sum_{n=1}^{N}(v_{0,n})^2} \cdot \sqrt{\sum_{n=1}^{N}(v_{i,n})^2}}$$

Where $v_0=[v_{0,1}, v_{0,2}, v_{0,3} \ldots v_{0,N}]$ is the embeddings of the old unviable API $api_0$, and $v_i=[v_{i,1}\ v_{1,2}, v_{1,3} \ldots v_{i,N}]$ is the embeddings of another available API $api_i$.

Then the register center 202 selects the document fragments that are deemed to be similar to the document fragment of the API whose corresponding microservice is down. "Similar" may be determined in two different ways. In one example embodiment, a document fragment is deemed to be similar to a document fragment for an API whose corresponding microservice is down if the calculated cosine correlation coefficient between the document fragments is greater than a threshold value. In another example embodiment, the top K document fragments with the highest calculated cosine correlation coefficients when compared to the document fragment for an API whose corresponding microservice is down, are deemed to be "similar."

It should be noted that either the threshold value or the K-value in the top K embodiment can be either static (e.g., set by a human to a fixed value) or may be dynamically determined automatically. In the case of automatic dynamic determination, a machine learning model may be trained to output a predicted "ideal" threshold value or K-value based on contextual information. Such contextual information may be, for example, the type of microservices environment, industry of a user of the microservices environment, performance or type of the LLM 206, etc.

Specifically, the machine learning model may be trained by any algorithm from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbors, decision trees, and hidden Markov models.

In an example embodiment, a machine learning algorithm used to train a machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of these machine learning models may take place as a dedicated training phase. In other example embodiments, the machine learning models may be retrained dynamically at runtime based on, for example, developer or user feedback.

The APIs corresponding to the document fragments deemed to be "similar" to the document fragment of the API of the downed microservice can be called "candidate APIs". At this stage, the candidate APIs are fed back into the LLM 206 to select one or more candidate APIs that can be considered to be 'qualified." Specifically, a prompt using the following template can be generated and send to the LLM 206:

You are a software expert. Now one old API is not available. Please find some new APIs from candidate APIs that can replace the old API. Make sure the old API and new APIs have similar functionality and input/output parameters.

This is the document of the old API

. . .

{document of old API}

. . .

These are the documents of candidate APIs

. . .

{documents of candidate APIs}

. . .

Please return the qualified new APIs that meet the requirement and parse the input/output parameters for old and new APIs.

For example, if {numbers of similar API}meet the requirement, please return

. . .

{example answer} . . .

If no API matches the requirement, please do not try to answer this question, just return none.

For example, the following prompt may be generated and sent to the LLM 206.

You are a software expert. Now one old API is not available. Please find some new APIs from candidate APIs that can replace the old API. Make sure the old API and new APIs have similar functionality and input/output parameters.

This is the document of the old API:

. . .

//document of old API

. . .

These are the documents of candidate APIs:

. . .

(1). documents of candidate API 1

(2). documents of candidate API 2

//more documents

. . .

Please return the qualified new APIs that meet the requirement and parse the corresponding input/output parameters for old and new APIs, return the pairs of (old parameter->new parameter).

For example, if the item (2), and (3) meet the requirement, please return:

. . .

(2). Input parameters mapping: {old_in_param_1->new_in_param_1, old_in_param_2->new_in_param_2, . . . }; output parameter mapping: {old_out_param_1->new_out_param_1, old_out_param_2->new_out_param_2, . . . }

(3). Input parameter mapping: {old_in_param_1->new_in_param_1, old_in_param_2->new_in_param_2, . . . }; output parameters mapping: {old_out_param_1->new_out_param_1, old_out_param_2->new_out_param_2, . . . }

. . .

. . .

If no API matches the requirement, please do not try to answer this question, just return none.

If the LLM 206 returns "none", then this means there are no qualified APIs that can replace the API of the downed microservice, and by extension, replace the downed microservice. If the LLM 206 returns one or more APIs, it also returns parameters of these APIs. The API can then be tested one-by-one using the parameters. This can be accomplished by running the possible qualified APIs using their associated parameters. If any of them are successful (e.g., they return types of values that match the types of values returned by the API whose microservice is down), then any of those successful APIs can be used with a temporary replacement microservice while the other microservice is down.

Figure 3:
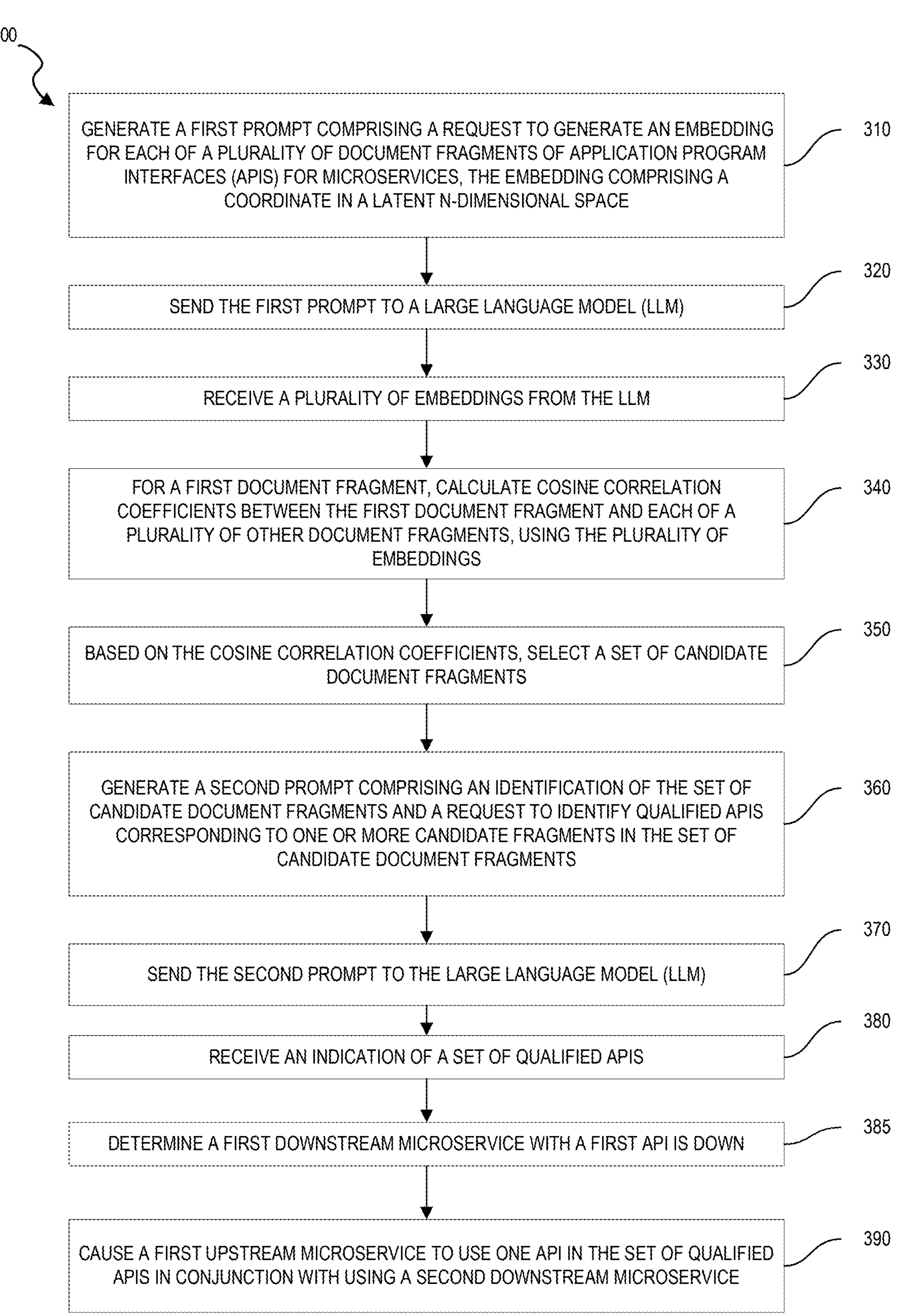
FIG. 3 is a flow diagram illustrating a method for managing microservices, in accordance with an example embodiment.

FIG. 3 is a flow diagram illustrating a method 300 for managing microservices, in accordance with an example embodiment.

At operation 310, a first prompt comprising a request to generate an embedding for each of a plurality of document fragments of application program interfaces (APIs) for microservices is generated. The embedding comprises a coordinate in a latent n-dimensional space. At operation 320, the first prompt is sent to a large language model (LLM).

At operation 330, a plurality of embeddings are received from the LLM. At operation 340, for a first document fragment, cosine correlation coefficients are calculated between the first document fragment and each of a plurality of other document fragments, using the plurality of embeddings. At operation 350, based on the cosine correlation coefficients, a set of candidate document fragments is selected.

At operation 360, a second prompt comprising an identification of the set of candidate document fragments and a request to identify qualified APIs corresponding to one or more candidate fragments in the set of candidate document fragments is generated. At operation 370, the second prompt is sent to the LLM. At operation 380, an indication of a set of qualified APIs is received from the LLM. At operation 385, it is determined that a first downstream microservice is down. At operation 390, in response to the determination, a first upstream microservice is caused to use one API in the set of qualified APIs in conjunction with using a second downstream microservice.

In view of the disclosure above, various examples are set forth below. It should be noted that one or more features of an example, taken in isolation or combination, should be considered within the disclosure of this application.

Example 1 is a system comprising: at least one hardware processor; a non-tangible computer-readable medium storing instructions that, when executed by the at least one hardware processor, cause the at least one hardware processor to perform operations comprising: generating a first prompt comprising a request to generate an embedding for each of a plurality of document fragments of application program interfaces (APIs) for microservices, the embedding comprising a coordinate in a latent n-dimensional space; sending the first prompt to a large language model (LLM); receiving a plurality of embeddings from the LLM; for a first document fragment, calculating cosine correlation coefficients between the first document fragment and each of a plurality of other document fragments, using the plurality of embeddings; based on the cosine correlation coefficients, selecting a set of candidate document fragments; generating a second prompt comprising an identification of the set of candidate document fragments and a request to identify qualified APIs corresponding to one or more candidate fragments in the set of candidate document fragments; sending the second prompt to the large language model (LLM); receiving an indication of a set of qualified APIs; determining a first downstream microservice with a first API is down; and in response to the determining, causing a first upstream microservice to use one API in the set of qualified APIs in conjunction with using a second downstream microservice.

In Example 2, the subject matter of Example 1 comprises, wherein the embedding is a high-dimensional floating point vector.

In Example 3, the subject matter of Examples 1-2 comprises, wherein the calculating cosine correlation coefficients is performed offline prior to a determination that the first downstream microservice is down.

In Example 4, the subject matter of Examples 1-3 comprises, wherein the selecting comprises: selecting a particular document fragment as part of the set of candidate document fragments if a cosine correlation coefficient corresponding to the particular document fragment exceeds a threshold.

In Example 5, the subject matter of Examples 1-4 comprises, wherein the selecting comprises: selecting a particular document fragment as part of the set of candidate document fragments if a cosine correlation coefficient corresponding to the particular document fragment has a value in a top K cosine correlation coefficients of the plurality of other document fragments.

In Example 6, the subject matter of Examples 4-5 comprises, wherein the threshold is dynamically determined based on output of a machine learning algorithm trained by a machine learning algorithm to generate the threshold based on contextual information about the microservices.

In Example 7, the subject matter of Examples 5-6 comprises, wherein K is dynamically determined based on output of a machine learning algorithm trained by a machine learning algorithm to generate a value for K based on contextual information about the microservices.

Example 8 is a method comprising: generating a first prompt comprising a request to generate an embedding for each of a plurality of document fragments of application program interfaces (APIs) for microservices, the embedding comprising a coordinate in a latent n-dimensional space; sending the first prompt to a large language model (LLM); receiving a plurality of embeddings from the LLM; for a first document fragment, calculating cosine correlation coefficients between the first document fragment and each of a plurality of other document fragments, using the plurality of embeddings; based on the cosine correlation coefficients, selecting a set of candidate document fragments; generating a second prompt comprising an identification of the set of candidate document fragments and a request to identify qualified APIs corresponding to one or more candidate fragments in the set of candidate document fragments; sending the second prompt to the large language model (LLM); receiving an indication of a set of qualified APIs; determining a first downstream microservice with a first API is down; and in response to the determining, causing a first upstream microservice to use one API in the set of qualified APIs in conjunction with using a second downstream microservice.

In Example 9, the subject matter of Example 8 comprises, wherein the embedding is a high-dimensional floating point vector.

In Example 10, the subject matter of Examples 8-9 comprises, wherein the calculating cosine correlation coefficients is performed offline prior to a determination that the First downstream microservice is down.

In Example 11, the subject matter of Examples 8-10 comprises, wherein the selecting comprises: selecting a particular document fragment as part of the set of candidate document fragments if a cosine correlation coefficient corresponding to the particular document fragment exceeds a threshold.

In Example 12, the subject matter of Examples 8-11 comprises, wherein the selecting comprises: selecting a particular document fragment as part of the set of candidate document fragments if a cosine correlation coefficient corresponding to the particular document fragment has a value in a top K cosine correlation coefficients of the plurality of other document fragments.

In Example 13, the subject matter of Examples 11-12 comprises, wherein the threshold is dynamically determined based on output of a machine learning algorithm trained by a machine learning algorithm to generate the threshold based on contextual information about the microservices.

In Example 14, the subject matter of Examples 12-13 comprises, wherein K is dynamically determined based on output of a machine learning algorithm trained by a machine learning algorithm to generate a value for K based on contextual information about the microservices.

Example 15 is a non-transitory machine-readable medium storing instructions which, when executed by one or more processors, cause the one or more processors to perform operations comprising: generating a first prompt comprising a request to generate an embedding for each of a plurality of document fragments of application program interfaces (APIs) for microservices, the embedding comprising a coordinate in a latent n-dimensional space; sending the first prompt to a large language model (LLM); receiving a plurality of embeddings from the LLM; for a first document fragment, calculating cosine correlation coefficients between the first document fragment and each of a plurality of other document fragments, using the plurality of embeddings; based on the cosine correlation coefficients, selecting a set of candidate document fragments; generating a second prompt comprising an identification of the set of candidate document fragments and a request to identify qualified APIs corresponding to one or more candidate fragments in the set of candidate document fragments; sending the second prompt to the large language model (LLM); receiving an indication of a set of qualified APIs; determining a first downstream microservice with a first API is down; and in response to the determining, causing a first upstream microservice to use one API in the set of qualified APIs in conjunction with using a second downstream microservice.

In Example 16, the subject matter of Example 15 comprises, wherein the embedding is a high-dimensional floating point vector.

In Example 17, the subject matter of Examples 15-16 comprises, wherein the calculating cosine correlation coefficients is performed offline prior to a determination that the First downstream microservice is down.

In Example 18, the subject matter of Examples 15-17 comprises, wherein the selecting comprises: selecting a particular document fragment as part of the set of candidate document fragments if a cosine correlation coefficient corresponding to the particular document fragment exceeds a threshold.

In Example 19, the subject matter of Examples 15-18 comprises, wherein the selecting comprises: selecting a particular document fragment as part of the set of candidate document fragments if a cosine correlation coefficient corresponding to the particular document fragment has a value in a top K cosine correlation coefficients of the plurality of other document fragments.

In Example 20, the subject matter of Examples 18-19 comprises, wherein the threshold is dynamically determined based on output of a machine learning algorithm trained by a machine learning algorithm to generate the threshold based on contextual information about the microservices.

Example 21 is at least one machine-readable medium comprising instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 4:
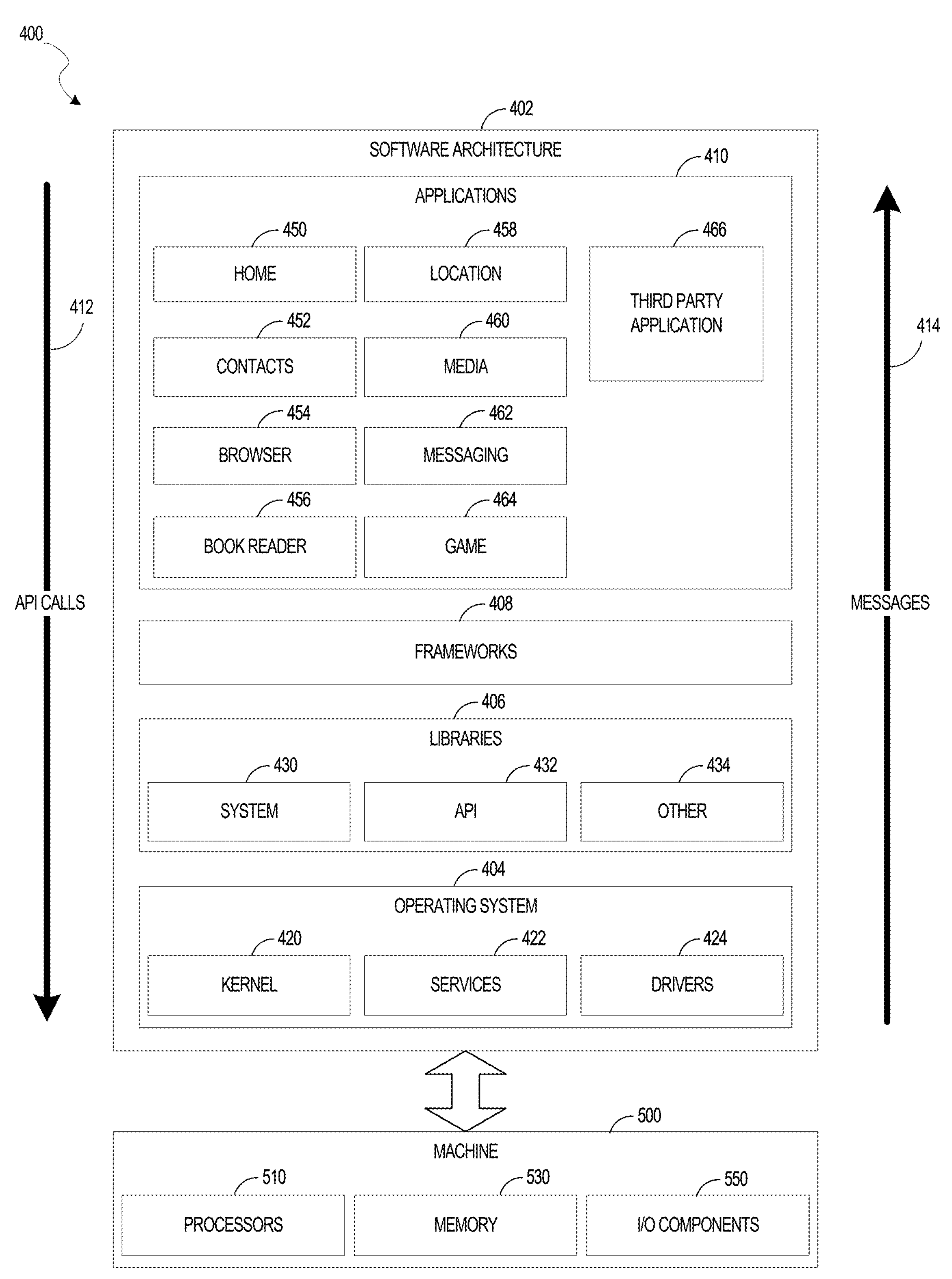
FIG. 4 is a block diagram illustrating a software architecture, in accordance with an example embodiment.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that comprises processors 510, memory 530, and input/output (I/O) components 550. In this example architecture, the software architecture 402 can be conceptualized as a stack of layers where each layer may provide a particular functionality. For example, the software architecture 402 comprises layers such as an operating system 404, libraries

406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 comprises, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionalities. The services 422 can provide other common services for the other software layers. The drivers 424 are responsible for controlling or interfacing with the underlying hardware, according to some embodiments. For instance, the drivers 424 can comprise display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can comprise system libraries 430 (e.g., C standard library) that can provide functions such as memory allocation functions, string manipulation functions, mathematic functions, and the like. In addition, the libraries 406 can comprise API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also comprise a wide variety of other libraries 434 to provide many other APIs to the applications 410.

The frameworks 408 provide a high-level common infrastructure that can be utilized by the applications 410, according to some embodiments. For example, the frameworks 408 provide various GUI functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 comprise a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
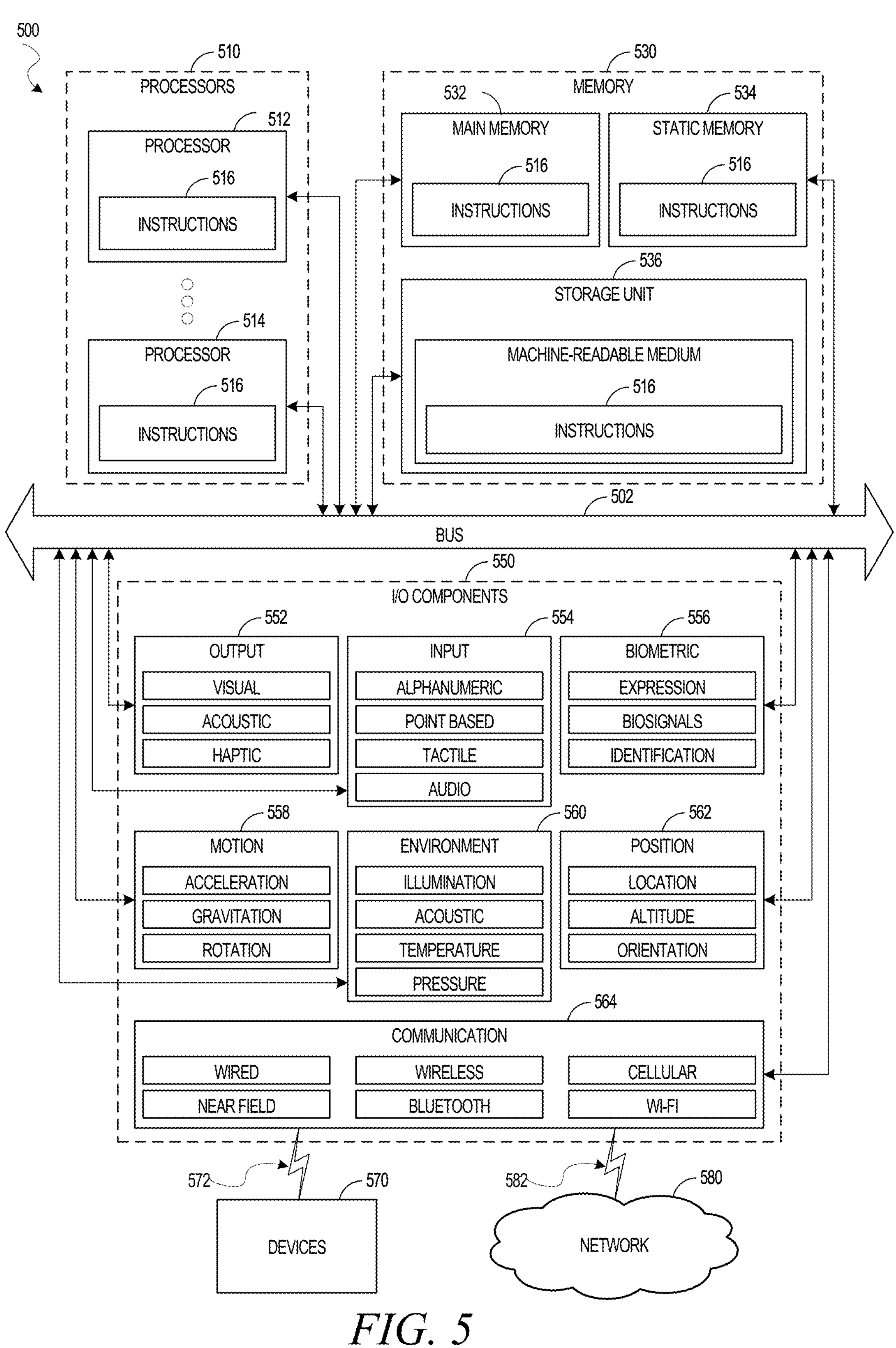
FIG. 5 illustrates a diagrammatic representation of a machine in the form of a computer system within which a set of instructions may be executed for causing the machine to perform any one or more of the methodologies discussed herein.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 300 of FIG. 3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to comprise a collection of machines 500 that individually or jointly execute the instructions 516 to perform any one or more of the methodologies discussed herein.

The machine 500 may comprise processors 510, memory 530, and I/O components 550, which may be configured to communicate with each other such as via a bus 502. In an example embodiment, the processors 510 (e.g., a central processing unit [CPU], a reduced instruction set computing [RISC] processor, a complex instruction set computing [CISC] processor, a graphics processing unit [GPU], a digital signal processor [DSP], an application-specific integrated circuit [ASIC], a radio-frequency integrated circuit [RFIC], another processor, or any suitable combination thereof) may comprise, for example, a processor 512 and a processor 514 that may execute the instructions 516. The term "processor" is intended to comprise multi-core processors that may comprise two or more independent processors (sometimes referred to as "cores") that may execute instructions 516 contemporaneously. Although FIG. 5 shows multiple processors 510, the machine 500 may comprise a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may comprise a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may comprise a wide variety of components to receive input, provide output, produce output, transmit information, exchange information, capture measurements, and so on. The specific I/O components 550 that are comprised in a particular machine will depend on the type of machine. For example, portable machines such as mobile phones will likely comprise a touch input device or other such input mechanisms, while a headless server machine will likely not comprise such a touch input device. It will be appreciated that the I/O components 550 may comprise many other components that are not shown in FIG. 5. The I/O components 550 are grouped according to functionality merely for simplifying the following discussion, and the grouping is in no way limiting. In various example embodiments, the I/O components 550 may comprise output components 552 and input components 554. The output components 552 may comprise visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may comprise alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may comprise biometric components 556, motion components 558, environmental components 560, or position components 562, among a wide array of other components. For example, the biometric components 556 may comprise components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may comprise acceleration sensor components (e.g., accelerometer), gravitation sensor components, rotation sensor components (e.g., gyroscope), and so forth. The environmental components 560 may comprise, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may comprise location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may comprise communication components 564 operable to couple the machine 500 to a network 580 or devices 570 via a coupling 582 and a coupling 572, respectively. For example, the communication components 564 may comprise a network interface component or another suitable device to interface with the network 580. In further examples, the communication components 564 may comprise wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or comprise components operable to detect identifiers. For example, the communication components 564 may comprise radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (e.g., 530, 532, 534, and/or memory of the processor[s]510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to comprise, but not be limited to, solid-state memories, and optical and magnetic media, comprising memory internal or external to processors. Specific examples of machine-storage media, computer-storage media, and/or device-storage media comprise non-volatile memory, comprising by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may comprise a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) comprising 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component comprised in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to comprise any intangible medium that is capable of storing, encoding, or carrying the instructions 516 for execution by the machine 500, and comprise digital or analog communications signals or other intangible media to facilitate communication of such software. Hence, the terms "transmission medium" and "signal medium" shall be taken to comprise any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to comprise both machine-storage media and transmission media. Thus, the terms comprise both storage devices/media and carrier waves/modulated data signals.

What is claimed is:

1. A system comprising:

at least one hardware processor;

a non-tangible computer-readable medium storing instructions that, when executed by the at least one hardware processor, cause the at least one hardware processor to perform operations comprising:

generating a first prompt comprising a request to generate an embedding for each of a plurality of document fragments of application program interfaces (APIs) for microservices, the embedding comprising a coordinate in a latent n-dimensional space;

sending the first prompt to a large language model (LLM);

receiving a plurality of embeddings from the LLM;

for a first document fragment, calculating cosine correlation coefficients between the first document fragment and each of a plurality of other document fragments, using the plurality of embeddings;

based on the cosine correlation coefficients, selecting a set of candidate document fragments;

generating a second prompt comprising an identification of the set of candidate document fragments and a request to identify qualified APIs corresponding to one or more candidate fragments in the set of candidate document fragments;

sending the second prompt to the large language model (LLM);

receiving an indication of a set of qualified APIs;

determining a first downstream microservice with a first API is down; and in response to the determining, causing a first upstream microservice to use one API in the set of qualified APIs in conjunction with using a second downstream microservice.

2. The system of claim 1, wherein the embedding is a high-dimensional floating point vector.

3. The system of claim 1, wherein the calculating cosine correlation coefficients is performed offline prior to a determination that the first downstream microservice is down.

4. The system of claim 1, wherein the selecting comprises: selecting a particular document fragment as part of the set of candidate document fragments if a cosine correlation coefficient corresponding to the particular document fragment exceeds a threshold.

5. The system of claim 1, wherein the selecting comprises: selecting a particular document fragment as part of the set of candidate document fragments if a cosine correlation coefficient corresponding to the particular document fragment has a value in a top K cosine correlation coefficients of the plurality of other document fragments.

6. The system of claim 4, wherein the threshold is dynamically determined based on output of a machine learning algorithm trained by a machine learning algorithm to generate the threshold based on contextual information about the microservices.

7. The system of claim 5, wherein K is dynamically determined based on output of a machine learning algorithm trained by a machine learning algorithm to generate a value for K based on contextual information about the microservices.

8. A method comprising:

generating a first prompt comprising a request to generate an embedding for each of a plurality of document fragments of application program interfaces (APIs) for microservices, the embedding comprising a coordinate in a latent n-dimensional space;

sending the first prompt to a large language model (LLM);

receiving a plurality of embeddings from the LLM;

for a first document fragment, calculating cosine correlation coefficients between the first document fragment and each of a plurality of other document fragments, using the plurality of embeddings;

based on the cosine correlation coefficients, selecting a set of candidate document fragments;

generating a second prompt comprising an identification of the set of candidate document fragments and a request to identify qualified APIs corresponding to one or more candidate fragments in the set of candidate document fragments;

sending the second prompt to the large language model (LLM);

receiving an indication of a set of qualified APIs;

determining a first downstream microservice with a first API is down; and in response to the determining, causing a first upstream microservice to use one API in the set of qualified APIs in conjunction with using a second downstream microservice.

9. The method of claim 8, wherein the embedding is a high-dimensional floating point vector.

10. The method of claim 8, wherein the calculating cosine correlation coefficients is performed offline prior to a determination that the First downstream microservice is down.

11. The method of claim 8, wherein the selecting comprises:

selecting a particular document fragment as part of the set of candidate document fragments if a cosine correlation coefficient corresponding to the particular document fragment exceeds a threshold.

12. The method of claim 8, wherein the selecting comprises:

selecting a particular document fragment as part of the set of candidate document fragments if a cosine correlation coefficient corresponding to the particular document fragment has a value in a top K cosine correlation coefficients of the plurality of other document fragments.

13. The method of claim 11, wherein the threshold is dynamically determined based on output of a machine learning algorithm trained by a machine learning algorithm to generate the threshold based on contextual information about the microservices.

14. The method of claim 12, wherein K is dynamically determined based on output of a machine learning algorithm trained by a machine learning algorithm to generate a value for K based on contextual information about the microservices.

15. A non-transitory machine-readable medium storing instructions which, when executed by one or more processors, cause the one or more processors to perform operations comprising:

generating a first prompt comprising a request to generate an embedding for each of a plurality of document fragments of application program interfaces (APIs) for microservices, the embedding comprising a coordinate in a latent n-dimensional space;

sending the first prompt to a large language model (LLM);

receiving a plurality of embeddings from the LLM;

for a first document fragment, calculating cosine correlation coefficients between the first document fragment and each of a plurality of other document fragments, using the plurality of embeddings;

based on the cosine correlation coefficients, selecting a set of candidate document fragments;

generating a second prompt comprising an identification of the set of candidate document fragments and a request to identify qualified APIs corresponding to one or more candidate fragments in the set of candidate document fragments;

sending the second prompt to the large language model (LLM);

receiving an indication of a set of qualified APIs;

determining a first downstream microservice with a first API is down; and in response to the determining, causing a first upstream microservice to use one API in the set of qualified APIs in conjunction with using a second downstream microservice.

16. The non-transitory machine-readable medium of claim 15, wherein the embedding is a high-dimensional floating point vector.

17. The non-transitory machine-readable medium of claim 15, wherein the calculating cosine correlation coefficients is performed offline prior to a determination that the First downstream microservice is down.

18. The non-transitory machine-readable medium of claim 15, wherein the selecting comprises:

selecting a particular document fragment as part of the set of candidate document fragments if a cosine correlation coefficient corresponding to the particular document fragment exceeds a threshold.

19. The non-transitory machine-readable medium of claim 15, wherein the selecting comprises:

selecting a particular document fragment as part of the set of candidate document fragments if a cosine correlation coefficient corresponding to the particular document fragment has a value in a top K cosine correlation coefficients of the plurality of other document fragments.

20. The non-transitory machine-readable medium of claim 18, wherein the threshold is dynamically determined based on output of a machine learning algorithm trained by a machine learning algorithm to generate the threshold based on contextual information about the microservices.

* * * * *